(12) United States Patent
Randall

(10) Patent No.: US 12,070,981 B2
(45) Date of Patent: Aug. 27, 2024

(54) INTERNAL STROKE SENSOR FOR AN IFP SHOCK ASSEMBLY

(71) Applicant: Fox Factory, Inc., Duluth, GA (US)

(72) Inventor: Connor Randall, Scotts Valley, CA (US)

(73) Assignee: Fox Factory, Inc., Duluth, GA (US)

( * ) Notice: Subject to any disclaimer, the term of this patent is extended or adjusted under 35 U.S.C. 154(b) by 0 days.

(21) Appl. No.: 17/507,169

(22) Filed: Oct. 21, 2021

(65) Prior Publication Data

US 2022/0126644 A1      Apr. 28, 2022

Related U.S. Application Data

(60) Provisional application No. 63/106,131, filed on Oct. 27, 2020.

(51) Int. Cl.
| | |
|---|---|
| *B60G 17/04* | (2006.01) |
| *B60G 13/08* | (2006.01) |
| *B60G 17/08* | (2006.01) |
| *F16F 9/46* | (2006.01) |
| *B60G 15/06* | (2006.01) |

(52) U.S. Cl.
CPC .............. *B60G 17/08* (2013.01); *B60G 13/08* (2013.01); *F16F 9/466* (2013.01); *B60G 15/062* (2013.01); *B60G 2202/24* (2013.01); *B60G 2400/252* (2013.01); *B60G 2400/5182* (2013.01); *B60G 2400/7162* (2013.01)

(58) Field of Classification Search
CPC ...... B60G 17/08; B60G 13/08; B60G 15/062; B60G 2202/24; B60G 2400/252; B60G 2400/5182; B60G 2400/7162; F16F 9/466

USPC ......... 188/314, 318, 322.21; 280/5.519, 275, 280/276

See application file for complete search history.

(56) References Cited

U.S. PATENT DOCUMENTS

| | | | |
|---|---|---|---|
| 4,771,866 A | 9/1988 | Heideman et al. | |
| 5,069,317 A * | 12/1991 | Stoll | .......................... F16F 9/49 188/286 |
| 6,296,091 B1 * | 10/2001 | Hamilton | .............. B60G 17/018 251/52 |

(Continued)

FOREIGN PATENT DOCUMENTS

| | | | |
|---|---|---|---|
| CN | 102943785 A * | 2/2013 | .............. F15B 15/14 |
| EP | 3992492 A1 | 5/2022 | |
| WO | 0027658 A1 | 5/2000 | |

OTHER PUBLICATIONS

European Search Report for European Application No. 21204685.8, 16 pages, Apr. 4, 2022.

*Primary Examiner* — Christopher P Schwartz

(57) ABSTRACT

An internal stroke sensor for an IFP shock assembly is disclosed herein. The shock assembly includes a damper chamber and a damping piston coupled to a piston shaft. The damping piston disposed in the damper chamber and axially movable relative to the damper chamber, the damping piston separating a compression portion from a rebound portion within the damper chamber. The shock assembly also includes an internal floating piston (IFP) and an IFP location sensor. The IFP location sensor to determine a position information for the IFP. A processor is configured to receive the position information for the IFP from the IFP location sensor and utilize the position information for the IFP to determine a shock stroke position of the shock assembly.

18 Claims, 9 Drawing Sheets

(56) References Cited

U.S. PATENT DOCUMENTS

| | | | |
|---|---|---|---|
| 6,698,729 B2* | 3/2004 | Popjoy | F16F 9/56 188/269 |
| 7,374,028 B2* | 5/2008 | Fox | F16F 9/512 188/322.15 |
| 8,196,721 B2* | 6/2012 | Gabriel | B60G 17/0424 188/274 |
| 8,838,335 B2 | 9/2014 | Bass et al. | |
| 8,950,558 B2 | 2/2015 | Turner et al. | |
| 9,303,713 B2* | 4/2016 | Ehre | F15B 15/2861 |
| 9,353,818 B2 | 5/2016 | Marking | |
| 9,446,859 B2* | 9/2016 | Fazeli | B64F 5/00 |
| 9,623,716 B2 | 4/2017 | Cox | |
| 10,112,702 B2* | 10/2018 | Cepic | B64C 25/60 |
| 11,505,024 B2* | 11/2022 | Sawarynski, Jr. | F16F 9/3292 |
| 2008/0148809 A1 | 6/2008 | Haney et al. | |
| 2009/0132122 A1* | 5/2009 | Kim | B60G 17/06 188/322.19 |
| 2011/0147148 A1 | 6/2011 | Ripa | |
| 2013/0228401 A1 | 9/2013 | Bender et al. | |
| 2018/0370320 A1 | 12/2018 | Roessle | |
| 2019/0101178 A1 | 4/2019 | Skognes et al. | |
| 2021/0101432 A1 | 4/2021 | Sawarynski et al. | |
| 2021/0122205 A1* | 4/2021 | Shukla | B60G 17/0182 |
| 2021/0199140 A1* | 7/2021 | Ito | F15B 11/024 |

* cited by examiner

INTERNAL STROKE SENSOR FOR AN IFP SHOCK ASSEMBLY

CROSS-REFERENCE TO RELATED APPLICATIONS (PROVISIONAL)

This application claims priority to and benefit of U.S. Provisional Patent Application No. 63/106,131 filed on Oct. 27, 2020, entitled "AN INTERNAL STROKE SENSOR FOR AN IFP SHOCK ASSEMBLY" by Connor Randall and assigned to the assignee of the present application, the disclosure of which is hereby incorporated by reference in its entirety.

FIELD OF THE INVENTION

Embodiments of the invention generally relate to methods and apparatus for use in vehicle suspension. Particular embodiments of the invention relate to methods and apparatus useful for vehicle shock assemblies.

BACKGROUND OF THE INVENTION

Vehicle suspension systems typically include a shock assembly. Often shock assemblies include a spring component or components and a damping component or components to control compression and rebound of the suspension system. The shock assemblies can be set up to provide a comfortable ride, to enhance performance of a vehicle, and the like.

Figure 1:
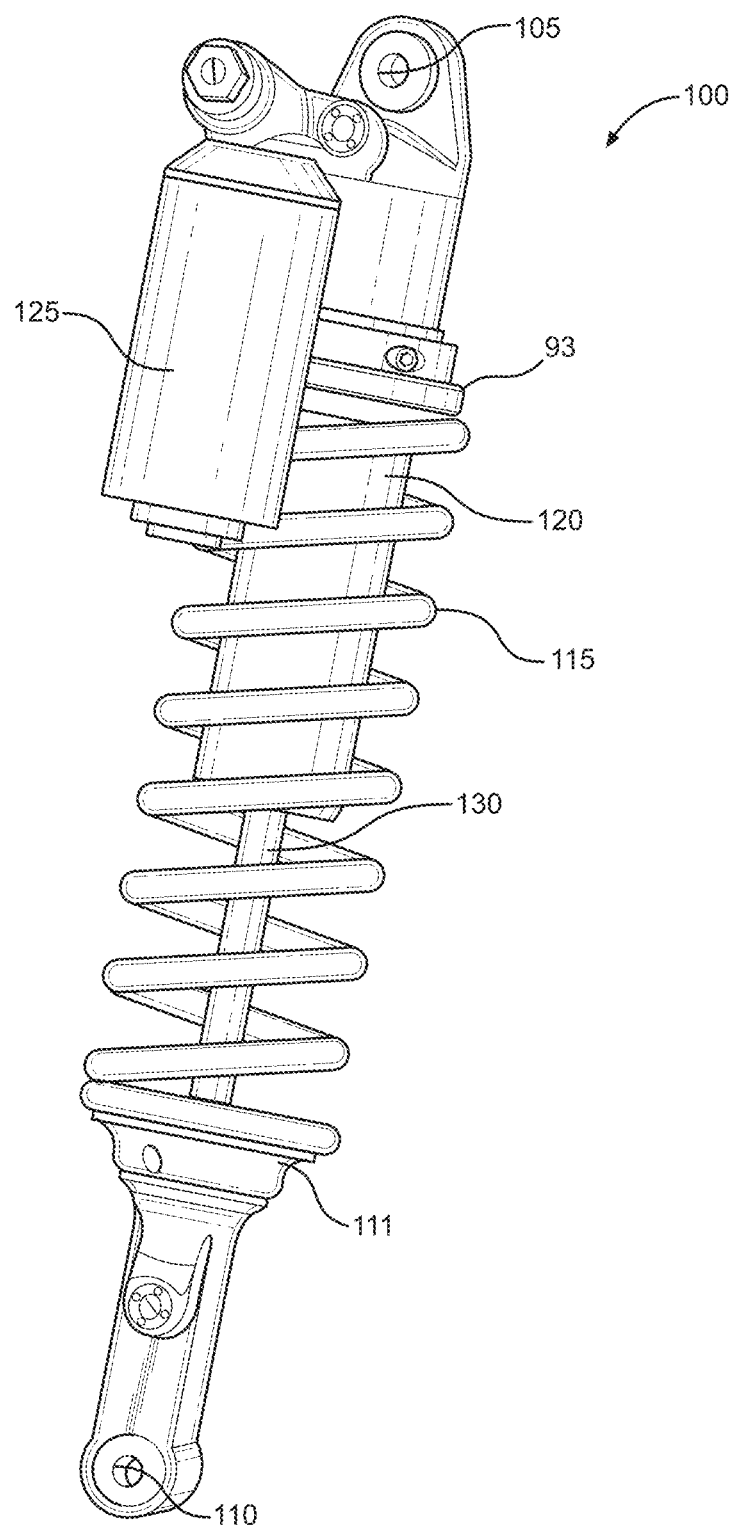
FIG. 1 is a perspective view of a shock assembly including a damper, external reservoir and helical spring, in accordance with an embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

In general, a suspension system for a vehicle provides a motion modifiable connection between a portion of the vehicle that is in contact with a surface and some or all of the rest of the vehicle that is not in contact with the surface. For example, the portion of the vehicle that is in contact with the surface can include one or more wheel(s), skis, tracks, hulls, etc., while some or all of the rest of the vehicle that is not in contact with the surface include suspended portions such as anything on a frame, a seat, handlebars, engines, cranks, etc.

In its basic form, the suspension is used to increase ride comfort, performance, endurance, component longevity and the like. In general, the force of jarring events, rattles, vibrations, jostles, and the like which are encountered by the portion of the vehicle that is in contact with the surface are reduced or even removed as it transitions through the suspension before reaching suspended portions of the vehicle to include components such as seats, steering wheels/handlebars, pedals/foot pegs, fasteners, drive trains, engines, and the like.

For example, on a wheeled vehicle, a portion of the wheel (or tire) will be in contact with the surface being traversed (e.g., pavement, dirt, gravel, sand, mud, rocks, etc.) while a shock assembly and/or other suspension system components will be coupled between a wheel retaining assembly and the suspended portion of the vehicle (often a portion of the vehicle frame and associated systems, the seat, handlebars, pedals, controls, steering wheel, interior, etc.).

In a snow machine, a portion of the track and/or the skis that will be in contact with the surface being traversed (e.g., snow, ice, etc.) while a shock assembly and/or other suspension components will be coupled between a track retaining assembly (and similarly the skis retaining assembly) and the suspended portion of the vehicle (usually including the engine and associated systems, the seat, handlebars, etc.).

In a boat or PWC vehicle, a portion of the hull will be in contact with the surface of the water while a shock assembly and/or other suspension components will be coupled between the hull and the suspended portion(s) of the vehicle (such as the seat, the handlebars, a portion of the vehicle frame, and/or the like).

In an airplane in flight, it is the airframe that is in contact with the surface being traversed (e.g., the air) while a shock assembly and/or other suspension components will be coupled between the airframe and the suspended portion(s) of the vehicle (such as the seats and the like).

As vehicle utilization scenarios change, one or more shock assemblies of the suspension system can be adjusted for different characteristics based on the use type of the vehicle, terrain, purpose (e.g., rock crawl, normal use, race set-up, etc.), and the like. For example, a downhill mountain bike rider (motocross rider, off-road truck driver, side-by-side rider, snow machine racer, etc.) would want a suspension configuration with a large range of motion and aggressive rebound and compression speeds to maintain as much contact as possible between the tires and the ground by absorbing the terrain events such as bumps, ruts, roots, rocks, dips, etc. while reducing the impacts felt at the suspended portion and also have the suspension return to its SAG setting as quickly as possible in preparation for the next encounter.

In contrast, a street bike racer (track racing vehicle, boat/PWC racer, etc.) would want a firmer suspension configuration with a very small range of motion to provide feel for the grip of the tire, maintain friction and/or aerodynamic geometries, and the like, in order to obtain the maximum performance from the vehicle.

In a normal use scenario, such as a trip to the local store, a ride around town or on a path, a drive to grandma's house, a boat ride out on a lake, etc., one choice for the suspension configuration would be based on providing the most comfort.

In one embodiment, there may be times where changes to a suspension component are desired during a given ride/drive. For example, a bike rider in a sprinting scenario would often want to firm up or possibly even lockout the suspension component to remove the opportunity for rider induced pedal bob. Similarly, a ride/drive from a paved road to an off-road environment (or vice-versa) would also be a time when a change to one or more suspension component settings is valuable to reduce the opportunity for bottom out.

In general, the term initial SAG settings or "SAG" refers to a pre-defined vehicle ride height and suspension geometry based on the initial compression of one or more shock assemblies of the suspension system for a given vehicle when it is within its normal load envelope configuration (e.g., with a rider/driver and any initial load weight). Once the SAG is established for a vehicle, it will be the designated ride height of the vehicle, until and unless the SAG is changed.

The initial SAG for a vehicle is usually established by the vehicle manufacturer. The SAG can then be modified and/or adjusted by an owner, a mechanic, or the like. For example, an owner can modify the SAG to designate a new normal ride height based on a vehicle use purpose, load requirements that are different than the factory load configuration, an adjustment, modification, and/or replacement of one or more of the suspension components, a change in tire size, a performance adjustment, aesthetics, and the like. Additional information regarding SAG and SAG setup can be found in U.S. Pat. No. 8,838,335 which is incorporated by reference herein, in its entirety.

The following discussion discloses a number of embodiments of an internal shock stroke sensor for an internal floating piston (IFP) in a shock assembly (hereinafter "internal shock stroke sensor assembly"). In general, the internal shock stroke sensor assembly is used to determine stroke position of the piston and/or piston rod of the shock assembly. Once determined, the stroke position information is provided to active and/or semi-active control system(s) or components for use in active and/or semi-active shock assemblies.

For example, in a shock assembly with one or more active valves, the stroke position information may be used for bottom-out control, compression and/or rebound stiffness adjustments, preload adjustments, performance evaluations, ride height adjustments, and the like. In one embodiment, an active suspension system includes a controller, one or more sensors, smart components, active valve dampers, or the like. Further detail and discussion of active and/or semi-active shock assemblies, active valves, an active valve damper operation, and the like is found in U.S. Pat. No. 9,353,818 which is incorporated by reference herein, in its entirety.

In one embodiment, the internal stroke sensor assembly determines shock stroke measurements by detecting the location (and change in location) of the IFP within the shock assembly. In one embodiment, the IFP location is determined by the internal stroke sensor assembly utilizing an IFP location sensor (which may be a proximity sensor, a pressure sensor, or the like). In one embodiment, the IFP position is determined by a proximity type IFP location sensor. In one embodiment, the IFP position is determined by a sensor such as a magnetic sensor, range sensor, or the like capable of determining and monitoring the location and/or distance of the IFP from the IFP location sensor.

In one embodiment, the IFP position is determined by the internal stroke sensor assembly utilizing a pressure sensor. In one embodiment, the pressure sensor will calculate a change in pressure to determine volume displacement of the IFP.

In one embodiment, the data from the internal stroke sensor assembly is transmitted to an external processor to calculate the shock stroke. In one embodiment, the data from the internal stroke sensor assembly is transmitted to an internal processor to calculate the shock stroke. In one embodiment, the internal or external processor will correct for thermal expansion of fluid and/or gas based on input from one or more temperature sensors.

In one embodiment, because internal stroke sensor assembly is internal to the shock assembly it is less susceptible to damage, dirt contamination, and the like. In one embodiment, the internal stroke sensor assembly is modular and can be implemented in any shock configuration with an IFP. In general, since the internal stroke sensor assembly is internal and modular, it does not require an aftermarket entity (e.g., builder, seller, customer, or the like) to perform any wiring of additional sensors, rotary pots, or the like.

With reference now to FIG. 1, a perspective view of a shock assembly 100 that includes an internal stroke sensor assembly 205 (shown in detail in the views of FIGS. 4A-4C) is shown in accordance with an embodiment. In one embodiment, internal stroke sensor assembly 205 includes a housing 406 (which may be internal to the shock assembly endcap, a modular endcap, or the like), an IFP location sensor 415 (which may be a proximity sensor, a pressure sensor, or the like), and one or both of a processor (such as a computer processor, microprocessor, or the like) and/or a transmitter (e.g., to transmit the position information for said IFP (and/or the pressure information from the fluid between the IFP and the IFP location sensor 415, or the like). In one embodiment, the transmitter transmits the information to a remote processor.

In one embodiment, the internal stroke sensor assembly 205 is a modular assembly within the housing 406 of the compression side of the damping chamber of the shock assembly having an IFP therein. Thus, in one embodiment, the internal stroke sensor assembly 205 can be added to an existing shock without an external reservoir by replacing the legacy endcap 231 on the damper housing of the shock assembly (which may include the mounting eyelet) with the housing 406 containing the internal stroke sensor assembly 205 (e.g., a modular housing for a modular internal stroke sensor assembly).

In one embodiment, such as a shock with external reservoir 125 having an IFP therein, the modular internal stroke sensor assembly can be added to an existing shock with an external reservoir having an IFP therein by replacing the legacy endcap of the external reservoir with housing 406 containing the internal stroke sensor assembly 205.

Referring still to FIG. 1, In one embodiment, shock assembly 100 includes a helical or coil spring 115, a damper housing 120 (with a damping piston 210 and damper chamber 220 shown in FIG. 2B) and an external reservoir 125. Fluid communication between the damper chamber 220 of the damper housing 120 and the external reservoir 125 may be via a flow channel including an adjustable needle valve. In its basic form, the damper housing 120 works in conjunction with the coil spring 115 and controls the speed of movement of the piston shaft 130 by metering incompressible fluid from one side of the damping piston 210 to the other, and additionally from the damper chamber 220 to the external reservoir 125, during a compression stroke (and in reverse during the rebound or extension stroke). A configuration of an external (or side) reservoir, including a floating piston, is described in U.S. Pat. No. 7,374,028 which patent is entirely incorporated herein by reference.

Shock assembly 100 also includes eyelets 105 and 110 for coupling shock assembly 100 with a suspension system. In one embodiment, coil spring 115 is disposed about a portion of the external surface of damper housing 120 and/or piston shaft 130. In the single spring embodiment of FIG. 1, coil spring 115 has one end abutting a preload flange 93 and another end coupled to a lower flange 111 located at a lower portion of shock assembly 100 close to eyelet 110.

In operation, shock assembly 100 is initially configured with a given preload and overall length. The overall length of shock assembly 100 is the distance between eyelet 105 and eyelet 110. The preload is defined by the distance between preload flange 93 and lower flange 111, and is held at the specified length by the compression of coil spring 115 therebetween. In general, there is more preload when the preload flange 93 is moved closer toward eyelet 110 (e.g., further compressing coil spring 115) and less preload the preload flange 93 is moved closer to eyelet 105 (e.g., reducing the compression of coil spring 115).

In one embodiment, the shock assembly 100 has a designated working length and the compression force of coil spring 115 applies a pressure to preload flange 93 and lower flange 111 to maintain the preload length of piston shaft 130 extending from damper housing 120 and thus the overall length of shock assembly 100 when it is installed into a vehicle suspension system.

When the vehicle suspension encounters a bump, shock assembly 100 enters a compression stage where the distance between eyelet 105 and 110 is reduced as the piston shaft 130 moves into the damper housing 120 the coil spring 115 is compressed. After the compression stage, shock assembly 100 enters a rebound stage where coil spring 115 provides a pressure on preload flange 93 and lower flange 111 causing the piston shaft 130 to move partially out of the damper housing 120. During both the compression and rebound strokes, the damping piston 210 is also working with the fluid in damper chamber 220 to control the speed of piston shaft 130.

It should be appreciated that the internal stroke sensor assembly discussed herein could be incorporated into a shock assembly like FIG. 1, or in another embodiment, into a shock assembly with more, fewer, or different components than those shown in FIG. 1, such as a multi-spring shock, air shock, etc. (examples of which are further shown in FIGS. 2A, 2B, 3A, and 3B). Moreover, the internal stroke sensor assembly disclosed herein could be used on one or more shock assemblies in power sports applications such as motorcycles, all-terrain vehicles (ATV), Side-by-Sides, utility vehicles (UTV), snowmobiles, scooters, recreational off-highway vehicles (ROV), multipurpose off-highway utility vehicles (MOHUV), personal watercrafts (PWC), and the like.

Figure 2A:
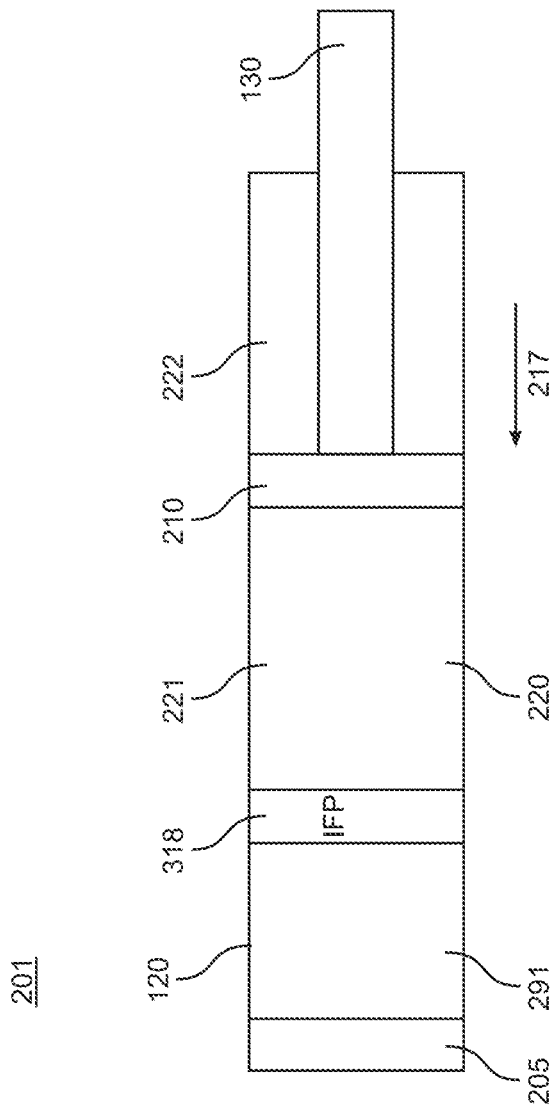
FIG. 2A is a schematic diagram of the internal stroke sensor for an IFP in a shock assembly, in accordance with an embodiment.

Referring now to FIG. 2A is a schematic diagram of the internal stroke sensor assembly 205 in a shock assembly 201 with no external reservoir is shown in accordance with one embodiment. In one embodiment, shock assembly 201 is similar to shock assembly 100 and includes damper housing 120, damper chamber 220 within damper housing 120, and piston shaft 130. In one embodiment, shock assembly 201 also includes a damping piston 210 fixed relative to piston shaft 130, both of which are axially movable relative to damper housing 120 and/or damper chamber 220.

In one embodiment, the damping piston 210 is equipped with fluid paths therethrough to permit damping fluid within the damper chamber 220 to be metered through the damping piston 210. For example, when the piston shaft 130 moves into the damper chamber 220 (as indicated by arrow 217), fluid moves from a first side (the compression side 221) to an opposite side (the rebound side 222) of the damper chamber 220 through the paths formed in the damping piston 210.

Additionally, shock assembly 201 includes an IFP 318 in the compression side 221 of damper chamber 220. In general, IFP 318 is used to separate different fluids within the damper. For example, in one embodiment, the IFP 318 keeps the fluid in compression side 221 separated from the nitrogen in gas portion 291. In one embodiment, the internal stroke sensor assembly 205 is located at the end of shock assembly 201 opposite the piston shaft 130 such as for example at a port in the body cap of shock assembly 201.

Figure 2B:
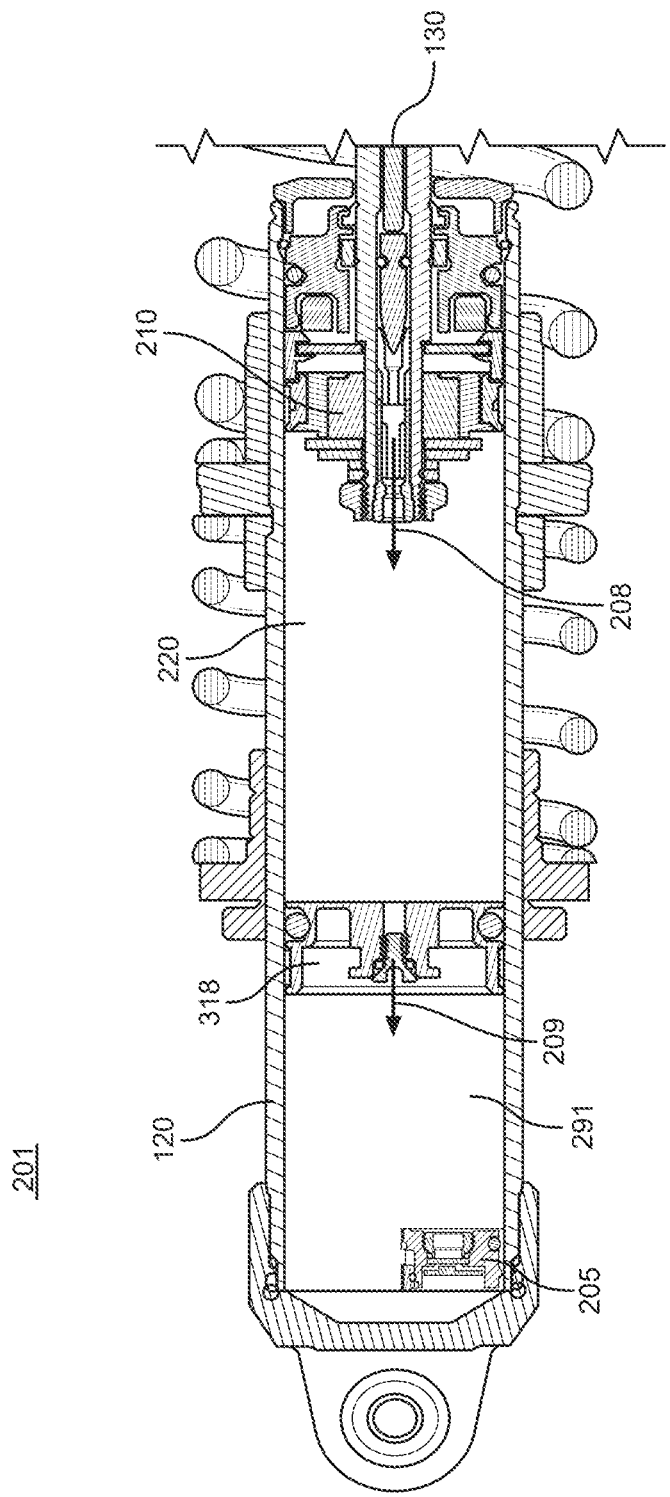
FIG. 2B is a section view of the internal stroke sensor for an IFP in a shock assembly, in accordance with an embodiment.

Referring now to FIG. 2B, a section view of the internal stroke sensor assembly 205 in a shock assembly 201 with no external reservoir as defined in the schematic of FIG. 2A, is shown in accordance with one embodiment.

In operation, piston shaft 130 displacement moves the IFP 318 by the volume of the shaft displaced fluid. In one embodiment, as shown in FIG. 2B, in compression the piston shaft 130 moves into the damper housing 120 (in the direction shown by arrow 208), causing the IFP 318 to move toward internal stroke sensor assembly 205 (in the direction shown by arrow 209).

In one embodiment, because internal stroke sensor assembly 205 is internal to the shock assembly, it is less susceptible to damage, dirt contamination, and the like. Moreover, internal stroke sensor assembly 205 is modular and can be implemented in any shock configuration with an IFP 318.

In one embodiment, since the internal stroke sensor assembly 205 is internal and modular, it does not require an aftermarket (e.g., builder, seller, or customer) to perform any wiring of additional sensors, rotary pots, etc.

Figure 3A:
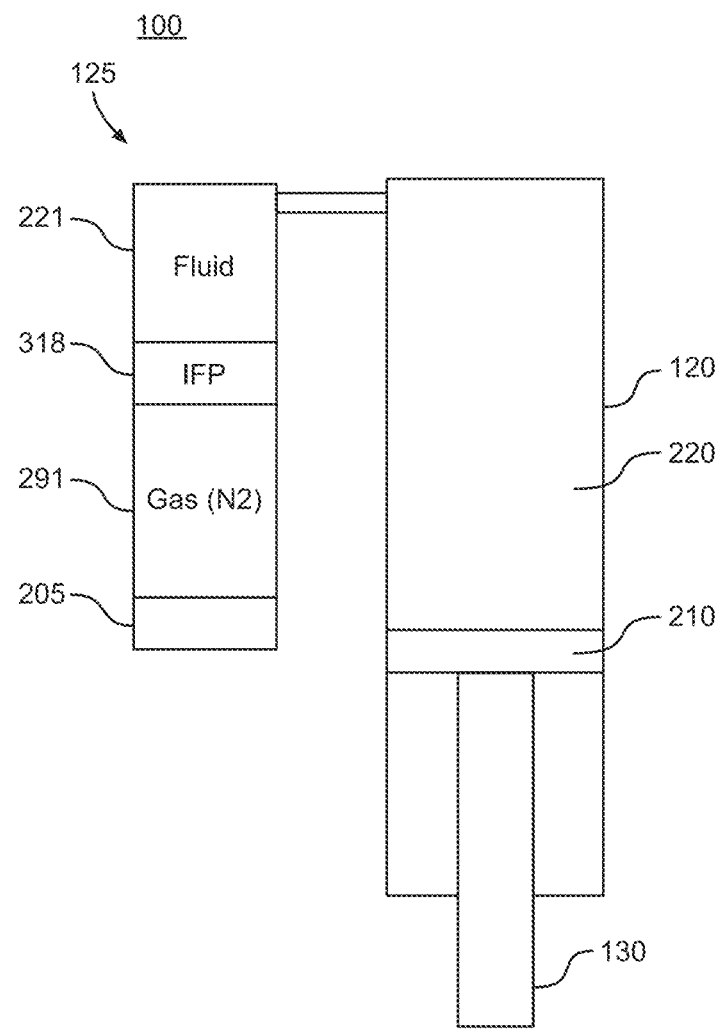
FIG. 3A is a schematic diagram of a piggyback shock setup with an external reservoir, where the internal stroke sensor for the IFP is in the external reservoir, in accordance with an embodiment.

Referring now to FIG. 3A, a schematic diagram of the internal stroke sensor assembly 205 in a piggyback shock setup with an external reservoir 125 is shown in accordance with an embodiment. In one embodiment, the components of FIG. 3A are similar in FIG. 2A with the difference mainly being the moving of the location of IFP 318 and the internal stroke sensor assembly 205 from the main chamber to the external reservoir 125.

In one embodiment, by putting the internal stroke sensor assembly 205 and the IFP 318 in the external reservoir 125, the stroke monitoring features and capabilities of the internal stroke sensor assembly 205 can be retroactively applied to any shock that can use an external reservoir 125 with an IFP 318. In one embodiment, the internal stroke sensor assembly is modular and will work will some, many, most, or all IFP 318 shock architectures.

Figure 3B:
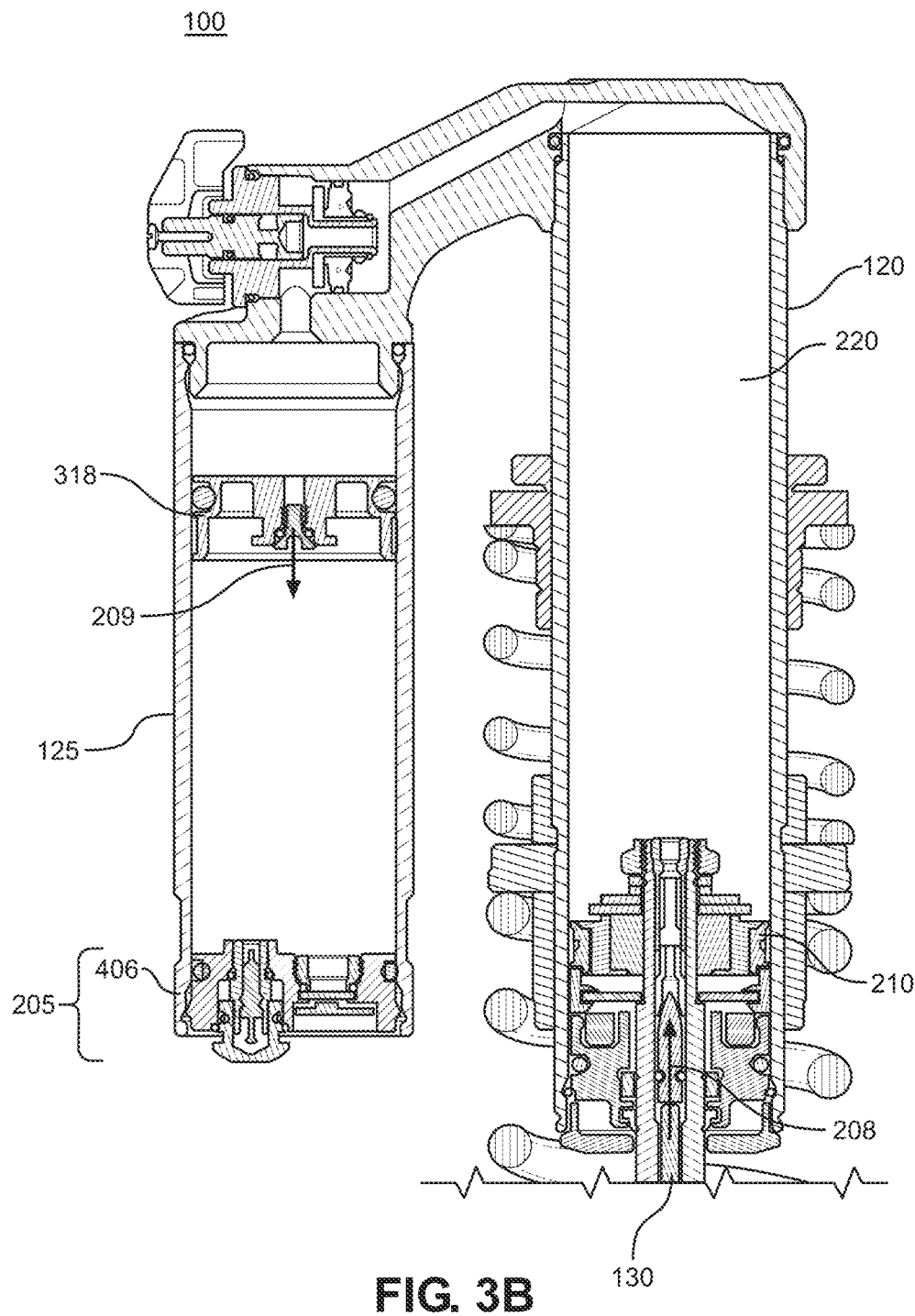
FIG. 3B is a section view of the piggyback shock setup with an external reservoir, where the internal stroke sensor for the IFP is in the external reservoir, in accordance with an embodiment.

Referring now to FIG. 3B, a section view of the piggyback shock setup with an external reservoir 125, where the internal stroke sensor assembly 205 is within housing 406 and housing 406 is acting as the endcap of the external reservoir 125, is shown in accordance with an embodiment. In one embodiment, the internal stroke sensor assembly 205 determines shock stroke position for use as feedback on semi-active control systems.

In one embodiment, because internal stroke sensor assembly 205 is internal to the shock assembly, it is less susceptible to damage, dirt contamination, and the like. Moreover, in one embodiment, internal stroke sensor assembly 205 is modular and can be implemented in any shock configuration having an IFP 318. In one embodiment, since the internal stroke sensor assembly 205 is internal and modular, it does not require an aftermarket (e.g., builder, seller, or customer) to perform any wiring of additional sensors, rotary pots, etc.

In the shock assembly with external reservoir 125 configuration of FIG. 3B, in one embodiment, the internal stroke sensor assembly 205 is within housing 406 located by (or used in replacement of) the endcap of the external reservoir 125. As such, in one embodiment, the internal stroke sensor assembly 205 can be added to an existing or legacy shock with external reservoir 125 configuration by replacing the legacy endcap on the external reservoir with housing 406 containing the internal stroke sensor assembly 205.

Referring still to FIG. 3B, in operation, piston shaft 130 motion moves the IFP 318 by the volume of the shaft displaced fluid. In one embodiment, in compression the piston shaft 130 moves into the damper housing 120 (in the direction shown by arrow 208), causing the IFP 318 to move down (in the direction shown by arrow 209).

In one embodiment, housing 406 has internal stroke sensor assembly 205 that detects the IFP 318 displacement using IFP location sensor 415. In one embodiment, internal stroke sensor assembly 205 uses a proximity sensor to detect and measure the IFP 318 displacement. In one embodiment, internal stroke sensor assembly 205 uses a pressure sensor to detect and measure the IFP 318 displacement. For example, the IFP 318 displacement causes a change in pressure between the IFP 318 and housing 406 (e.g., the endcap for the external reservoir). That change in pressure is measured by internal stroke sensor assembly 205.

In one embodiment, internal stroke sensor assembly 205 determines shock stroke by detecting the position of IFP 318 in external reservoir 125. In one embodiment, the IFP 318 position is determined by utilizing a proximity type IFP location sensor 415. In one embodiment, the IFP 318 position is determined by utilizing a pressure type IFP location sensor 415. In one embodiment, the pressure type IFP location sensor 415 will calculate a change in fluid pressure between the IFP 318 and the IFP location sensor 415 to determine volume displacement of IFP 318.

In one embodiment, internal stroke sensor assembly 205 also utilizes information from an optional temperature sensor to provide data to compensate for temperature errors such as thermal expansion/contraction of the working fluid (such as oil) and/or gas (e.g., nitrogen) and the like. In one embodiment, the temperature sensor is located on or about IFP 318. In one embodiment, the temperature sensor is located on or about the internal stroke sensor assembly 205 and/or housing 406. In one embodiment, the temperature sensor is located at one or more different locations to monitor the fluid and/or gas temperatures in shock assembly 100.

In one embodiment, the data from internal stroke sensor assembly 205 is transmitted to an external processor to calculate shock stroke. In one embodiment, the data from internal stroke sensor assembly 205 is transmitted to an internal processor (located on or about the internal stroke sensor assembly 205 and/or housing 406) to calculate shock stroke. In one embodiment, the temperature data is transmitted to the internal and/or external processor and is used to adjust/modify the stroke calculation based on a thermal expansion/contraction of the fluid or gas within the shock assembly.

Figure 4A:
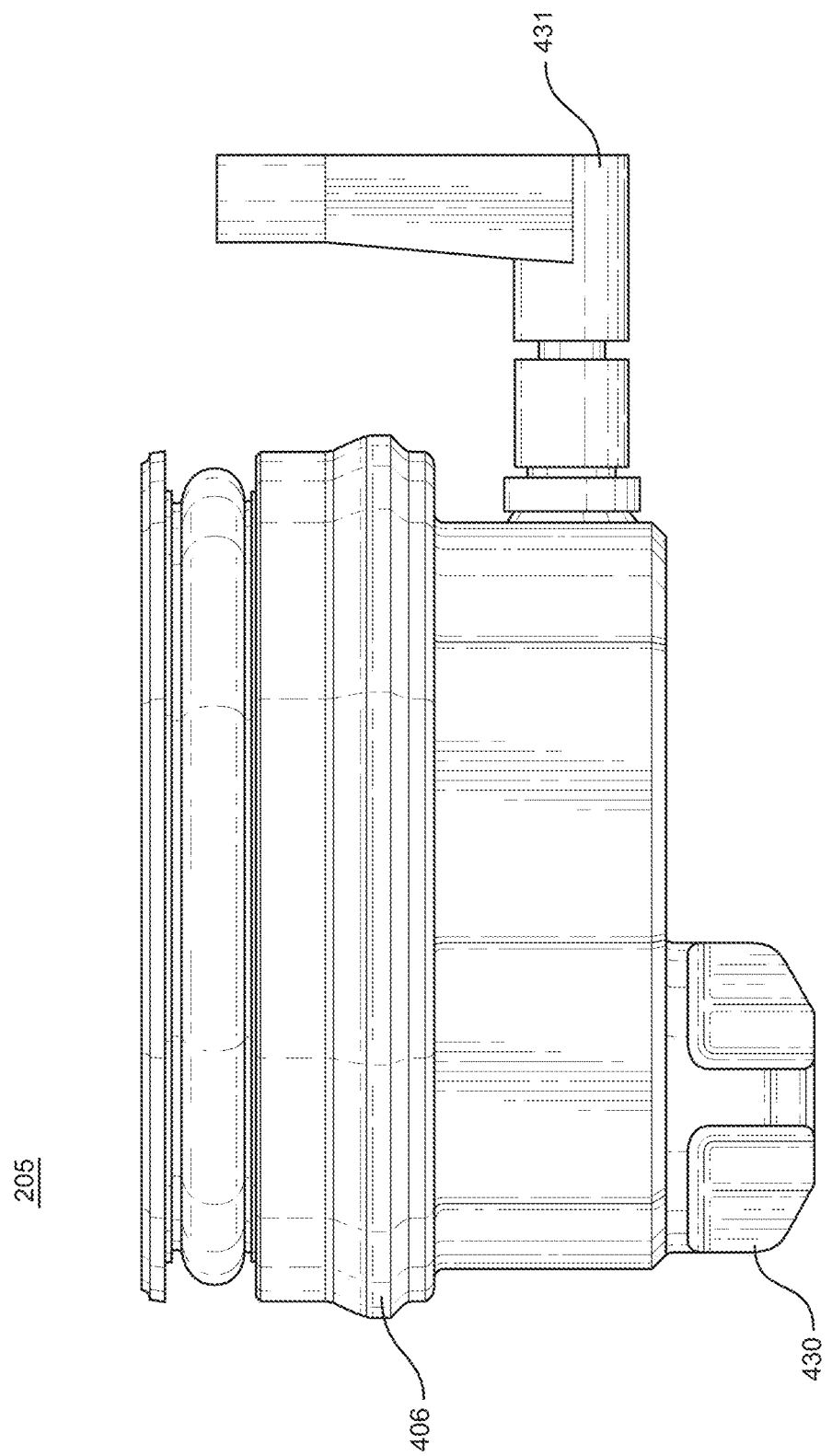
FIG. 4A is a side view of an external reservoir end cap with internal stroke sensor for an IFP shock assembly, in accordance with an embodiment.

Referring now to FIG. 4A, a side view of internal stroke sensor assembly 205 including a housing 406 (such as a modular housing or endcap) with a valve 430 (such as a Schrader valve or the like) for fluid fill, and an optional IMU with temperature sensor 431 is shown in accordance with an embodiment.

Figure 4B:
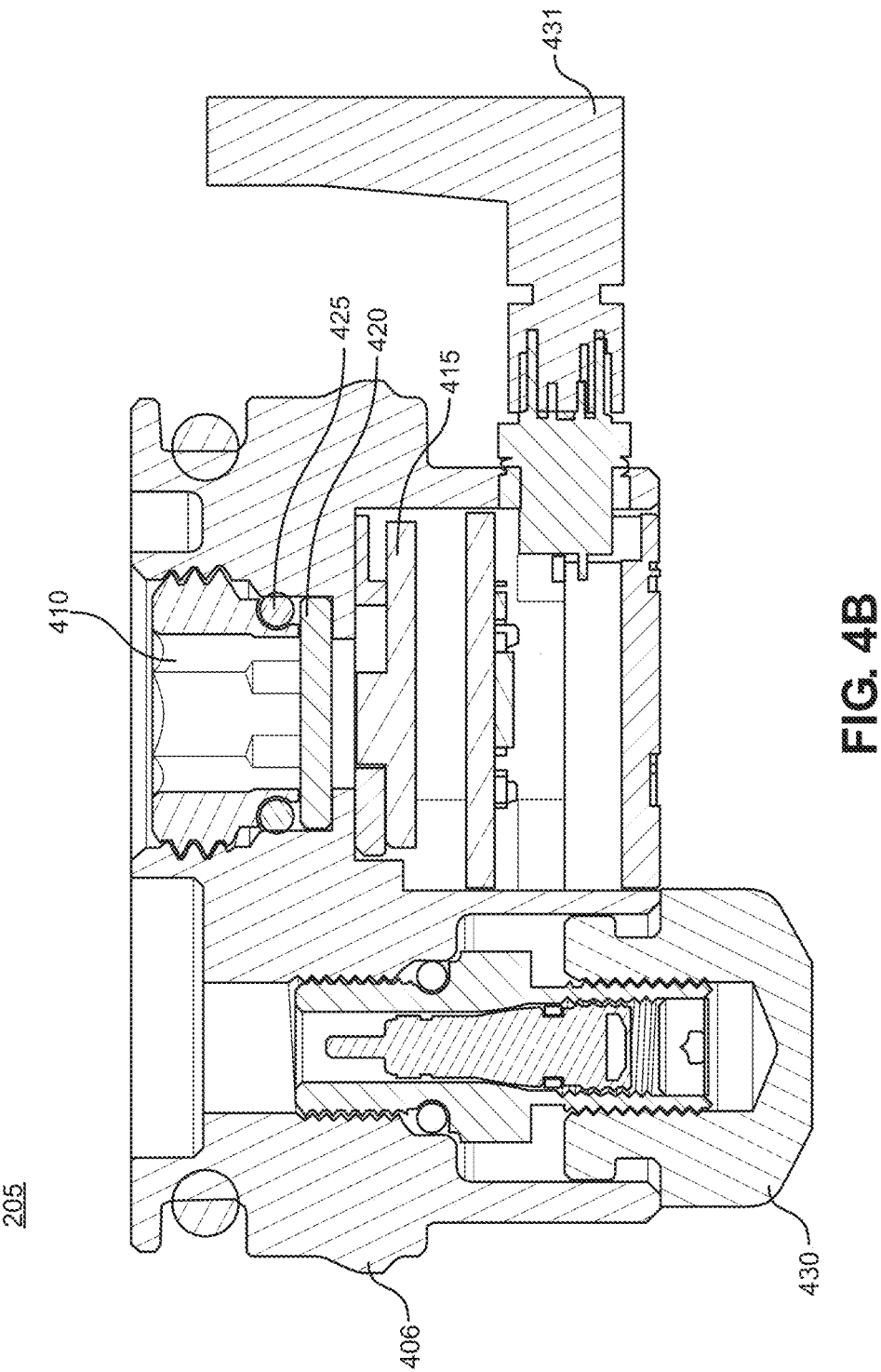
FIG. 4B is a section view of an external reservoir end cap with internal stroke sensor for an IFP shock assembly, in accordance with an embodiment.

With reference now to FIG. 4B, a section view of internal stroke sensor assembly 205 including a housing 406 (such as a modular housing or endcap) with a valve 430 (such as a Schrader valve or the like) for gas fill, and optional IMU with temperature sensor 431 is shown in accordance with an embodiment. In FIG. 4B, internal stroke sensor assembly 205 is utilizing IFP location sensor 415 (e.g., a PCB/proximity sensor) behind a cover window 420. In one embodiment, cover window 420 is glass. In another embodiment, cover window 420 is another transparent material such as plastic, or the like. In one embodiment, retaining feature 410 (e.g., a retaining feature such as, but not limited to, a screw, clamp, nut/bolt, pin, nail, nut, glue, epoxy, resin, or the like) is used to retain the components of internal stroke sensor assembly 205 within.

In one embodiment, if the IFP location sensor 415 is a proximity sensor, it may be sealed within housing 406, separated from the fluid within external reservoir 125 and target the IFP 318 through cover window 420. In one embodiment, the IFP location sensor 415 is sealed within the endcap such that the pressure within the external reservoir 125 is not being applied to the IFP location sensor 415.

In one embodiment, the IFP location sensor 415 provides position information regarding the location of IFP 318.

In one embodiment, the IFP location sensor 415 provides a velocity feedback, e.g., a velocity for the IFP 318. In one embodiment, the velocity feedback is done by taking the derivative of the read position value of the IFP 318 processed in real time by a microcontroller (either embedded or external).

In one embodiment, the IFP location sensor 415 provides a velocity feedback that is expanded to acceleration if desired. In general, velocity is useful for many calculations but also for some technologies like main piston valves when you need to have a good understanding of if you are in compression vs rebound which could be detected with velocity.

In one embodiment, when the IFP location sensor 415 is a pressure sensor, some or all of the sensor may not be sealed within the endcap (e.g., not separate from the fluid within the shock assembly) such that the pressure within the external reservoir 125 is applied to the pressure sensor.

In one embodiment, one or more of the components of internal stroke sensor assembly 205 will be wired to the controller and/or processor using the same wiring that is used by any active valves or the like within the existing shock assembly. In one embodiment, having the internal stroke sensor assembly 205 at ambient pressure allows a simplified means of wirelessly connecting the IFP location sensor 415 to the active/semi-active shock wiring harness. In another embodiment, the internal stroke sensor assembly 205 can include a power source (such as a battery e.g., rechargeable and/or non-rechargeable, or other power source) will wirelessly communicate with the controller and/or processor.

In one embodiment, instead of internal stroke sensor assembly 205 being inside housing 406, internal stroke sensor assembly 205 is housed inside IFP 318 internal to the endcap.

Figure 4C:
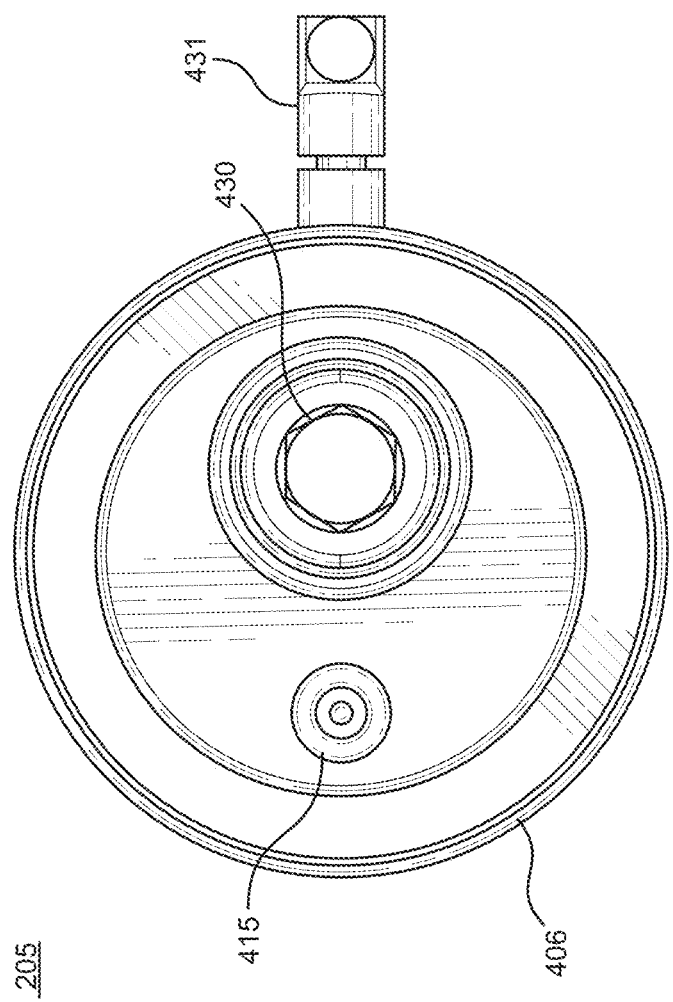
FIG. 4C is a top view of an external reservoir end cap with internal stroke sensor for an IFP shock assembly, in accordance with an embodiment.

Referring now to FIG. 4C, a top view internal stroke sensor assembly 205 including housing 406 (such as a modular housing or endcap), valve 430 (such as a Schrader valve or the like) for fluid fill, optional IMU with temperature sensor 431, and IFP location sensor 415 is shown in accordance with an embodiment. In one embodiment, the top view would be the view within the shock assembly chamber and facing toward the IFP 318. Although, in one embodiment, optional IMU with temperature sensor 431 is shown external to the housing 406, it should be appreciated that in another embodiment optional IMU with temperature sensor 431 could be integrated within the housing. In one embodiment, internal stroke sensor assembly 205 also includes other sensor types such as an accelerometer, inclinometer, and the like.

Figure 5:
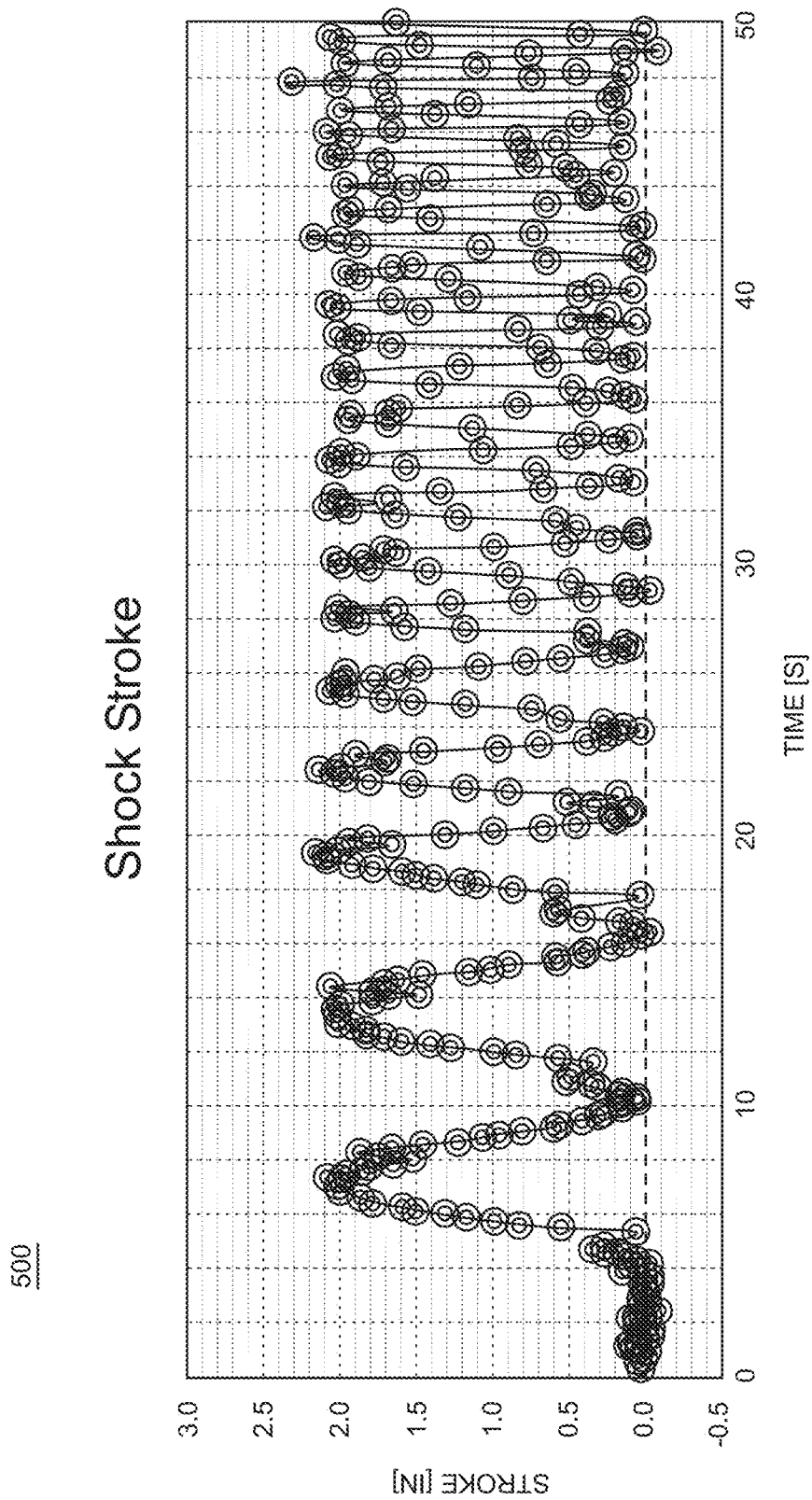
FIG. 5 is a graph of internal stroke sensor for an IFP shock assembly output, in accordance with an embodiment.

Referring now to FIG. 5, a graph 500 of internal stroke sensor assembly output is shown in accordance with an embodiment. In graph 500 the shock stroke in inches versus time is shown. In one embodiment, the graph 500 is based on the internal stroke sensor assembly 205 positioned in housing 406. In one embodiment, the shock assembly 100 is pressurized with Nitrogen. In one embodiment, graph 500 is based on shock assembly 100 tested on dyno with a sinusoidal input varying frequency. In one embodiment, a microcontroller saves data and converts data from the IFP location sensor 415 to determine a shock stroke.

For active valves, including those used for, compression and/or rebound stiffness adjustments, preload adjustments, bottom-out control, preload adjustment, and ride height adjustment see, as an example, the electronic valve of FIGS. 2-4 of U.S. Pat. No. 9,353,818 which is incorporated by reference herein, in its entirety, as further example of different types of "electronic" or "active" valves). See also, as an example, U.S. Pat. No. 9,623,716 which is incorporated by reference herein, in its entirety.

For additional detail and description of thermal expansion compensation, see, as an example, U.S. Pat. No. 8,950,558 which is incorporated by reference herein, in its entirety. For additional detail and description of adjustable preload, crossover, bottom-out, see, as an example, U.S. Patent Application 20190101178 which is incorporated by reference herein, in its entirety.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments could be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A shock assembly comprising:
 a damper chamber;
 a damping piston coupled to a piston shaft, said damping piston disposed in said damper chamber and axially movable relative to said damper chamber, said damping piston separating a compression portion from a rebound portion within said damper chamber;
 an internal floating piston (IFP);
 an IFP location sensor, said IFP location sensor to determine a position information for said IFP; and
 a processor configured to:
  receive said position information for said IFP from said IFP location sensor;
  receive a temperature measurement for damping fluid of said shock assembly; and
  utilize said temperature measurement to perform a thermal expansion correction on said position information for said IFP; and
  utilize said position information for said IFP and said thermal expansion correction on said position information for said IFP to determine a shock stroke position of said shock assembly.

2. The shock assembly of claim 1, further comprising:
 a temperature sensor, said temperature sensor configured to:
  obtain said temperature measurement for said damping fluid of said shock assembly: and
  provide said temperature measurement to said processor.

3. The shock assembly of claim 2, wherein said IFP location sensor, said processor, and said temperature sensor are mounted in a sealed modular housing, said sealed modular housing configured to replace an end cap of said shock assembly.

4. The shock assembly of claim 3, wherein said sealed modular housing is capable of being retrofit to a legacy shock assembly.

5. The shock assembly of claim 1, wherein said processor is a remote processor and said IFP location sensor further comprises:
 a transmitter to transmit said position information for said IFP to said remote processor.

6. The shock assembly of claim 1, wherein said IFP location sensor is located within said compression portion of said damper chamber.

7. The shock assembly of claim 1, wherein said IFP location sensor is located external to said compression portion of said damper chamber.

8. The shock assembly of claim 1, further comprising:
 an external reservoir fluidly coupled with said damper chamber;
 said IFP located within said external reservoir; and
 said IFP location sensor located within said external reservoir.

9. The shock assembly of claim 1, further comprising:
 an external reservoir fluidly coupled with said damper chamber;
 said IFP located within said external reservoir; and
 said IFP location sensor located external of said external reservoir.

10. The shock assembly of claim 1, wherein said IFP location sensor is a proximity sensor.

11. The shock assembly of claim 1, wherein said IFP location sensor is a pressure sensor.

12. A method for determining shock stroke position, said method comprising:

utilizing an internal floating piston (IFP) location sensor to determine a position information for an IFP within a shock assembly;

providing said position information for said IFP from said IFP location sensor to a processor;

utilizing a temperature sensor to obtain a temperature measurement for at least one fluid in contact with said IFP;

providing said temperature measurement to said processor;

utilizing said temperature measurement to perform a thermal expansion correction on said position information for said IFP; and utilizing said position information for said IFP and said thermal expansion correction on said position information for said IFP to determine a shock stroke position of said shock assembly.

13. The method of claim 12, wherein said processor is a remote processor and said method further comprises:

transmitting said position information for said IFP from said IFP location sensor to said remote processor.

14. The method of claim 12, wherein said IFP location sensor is selected from a group of sensors consisting of: a proximity sensor and a pressure sensor.

15. An internal stroke sensor assembly comprising:

a modular housing configured to replace an end cap of a shock assembly;

an internal floating piston (IFP) location sensor within a sealed portion of said modular housing, said IFP location sensor to determine a position information for an IFP within said shock assembly;

a temperature sensor within said modular housing, said temperature sensor configured to:
  obtain a temperature measurement for at least one fluid about said IFP; and
  provide said temperature measurement to a processor; and a communications interface within said sealed portion of said modular housing, said communications interface to provide said position information for said IFP from said IFP location sensor to said processor, said processor configured to:
  receive said position information for said IFP from said IFP location sensor;
  utilize said temperature measurement to perform a thermal expansion correction on said position information for said IFP; and
  utilize said position information for said IFP and said thermal expansion correction on said position information for said IFP to determine a shock stroke position of said shock assembly.

16. The internal stroke sensor assembly of claim 15, wherein said processor is within said sealed portion of said modular housing.

17. The internal stroke sensor assembly of claim 15, wherein said processor is remote from said modular housing.

18. The internal stroke sensor assembly of claim 15, wherein said modular housing is capable of being retrofit to a legacy shock assembly.

* * * * *